Jan. 30, 1951 W. LEATHERS 2,540,033
TIME AND PRODUCTION RECORDING APPARATUS
Original Filed Feb. 21, 1945 10 Sheets-Sheet 1
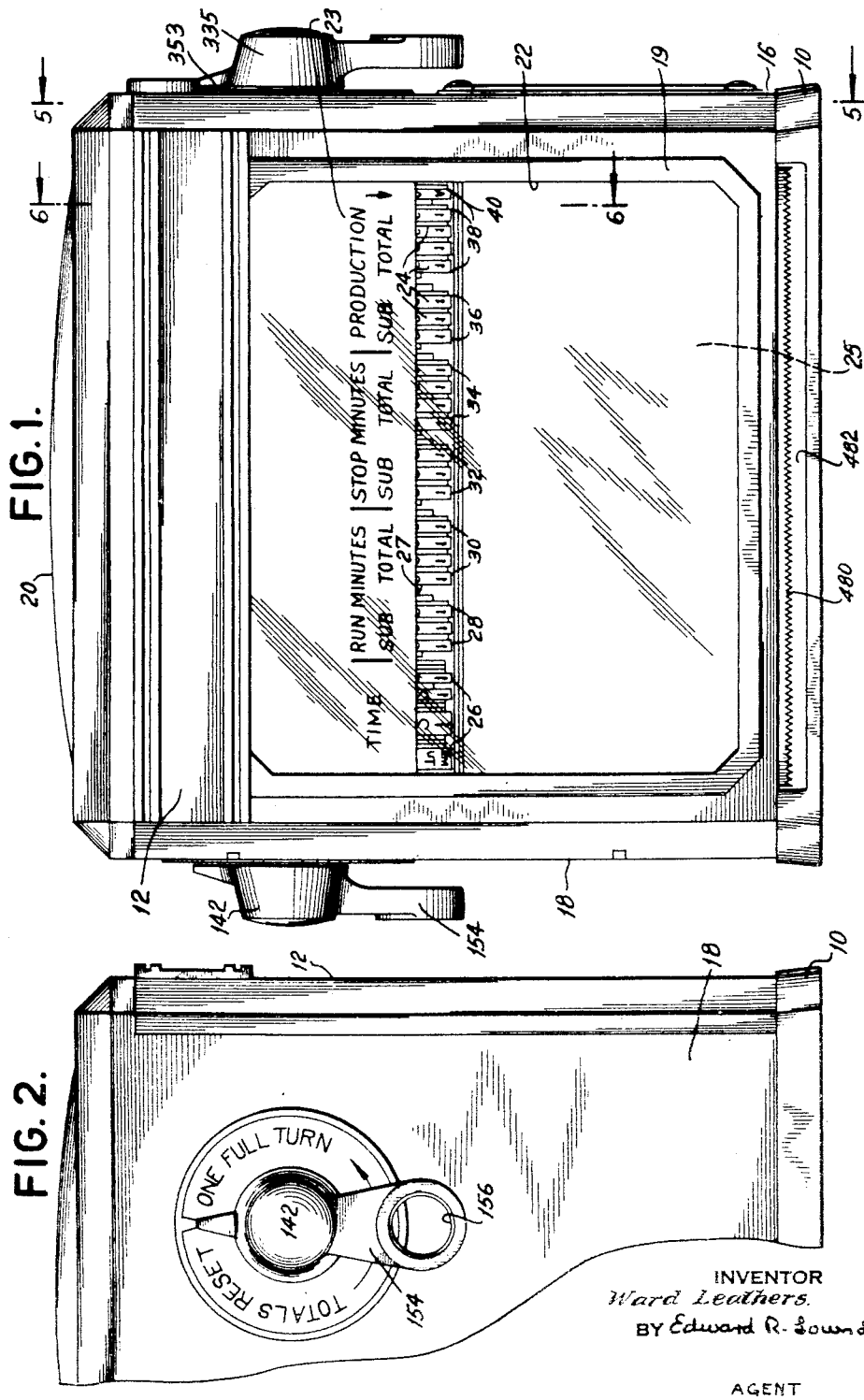
INVENTOR
Ward Leathers.
BY Edward R. Lounder
AGENT Jan. 30, 1951 W. LEATHERS 2,540,033
TIME AND PRODUCTION RECORDING APPARATUS
Original Filed Feb. 21, 1945 10 Sheets-Sheet 2
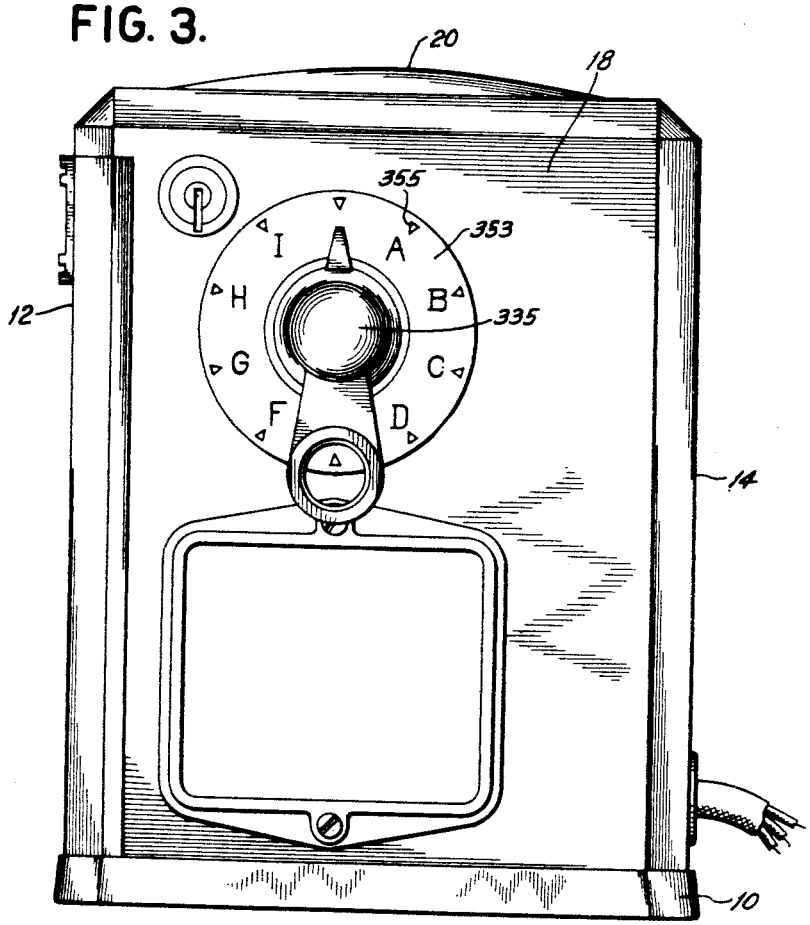
INVENTOR
Ward Leathers.
BY Edward R. Lownds
AGENT Jan. 30, 1951 W. LEATHERS 2,540,033
TIME AND PRODUCTION RECORDING APPARATUS
Original Filed Feb. 21, 1945 10 Sheets-Sheet 3

INVENTOR
*Ward Leathers.*
BY *Edward R. Lowndes*

AGENT

INVENTOR
Ward Leathers.
BY
Edward R. Lowndes
AGENT

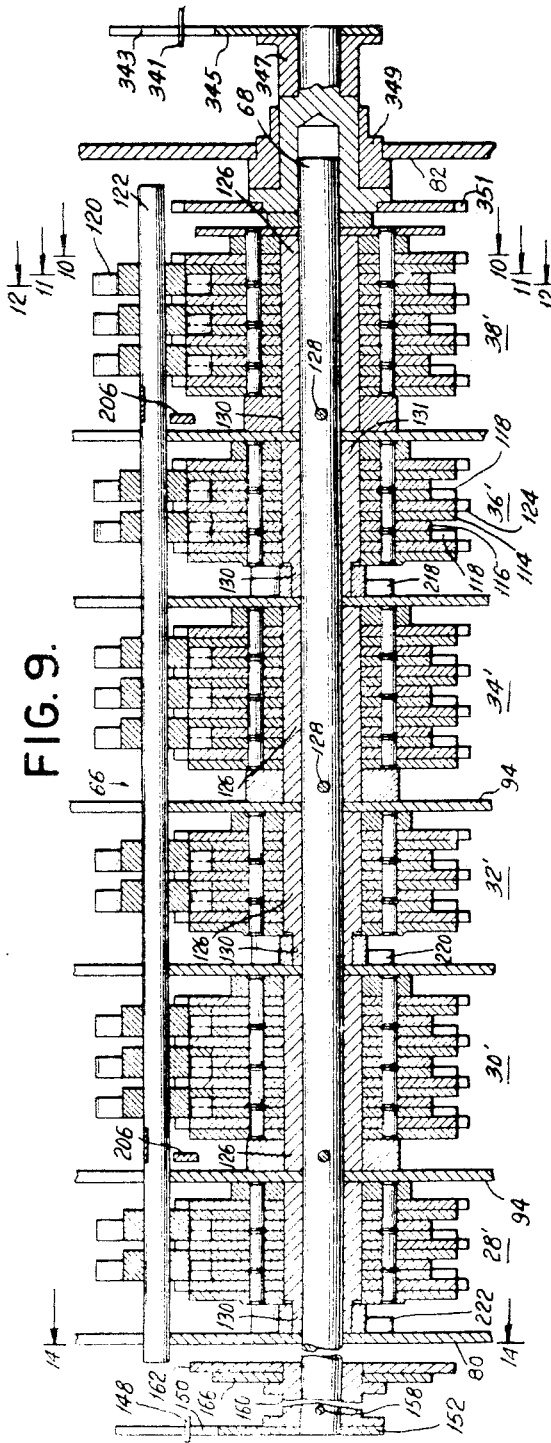

Jan. 30, 1951 W. LEATHERS 2,540,033
TIME AND PRODUCTION RECORDING APPARATUS
Original Filed Feb. 21, 1945 10 Sheets-Sheet 9

INVENTOR.
Ward Leathers.
BY
Edward R. Lowndes
AGENT

Jan. 30, 1951 W. LEATHERS 2,540,033
TIME AND PRODUCTION RECORDING APPARATUS
Original Filed Feb. 21, 1945 10 Sheets-Sheet 10
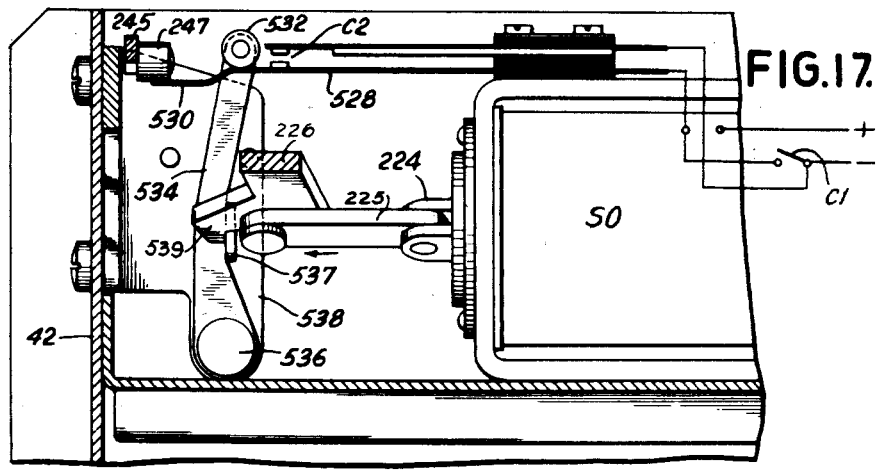
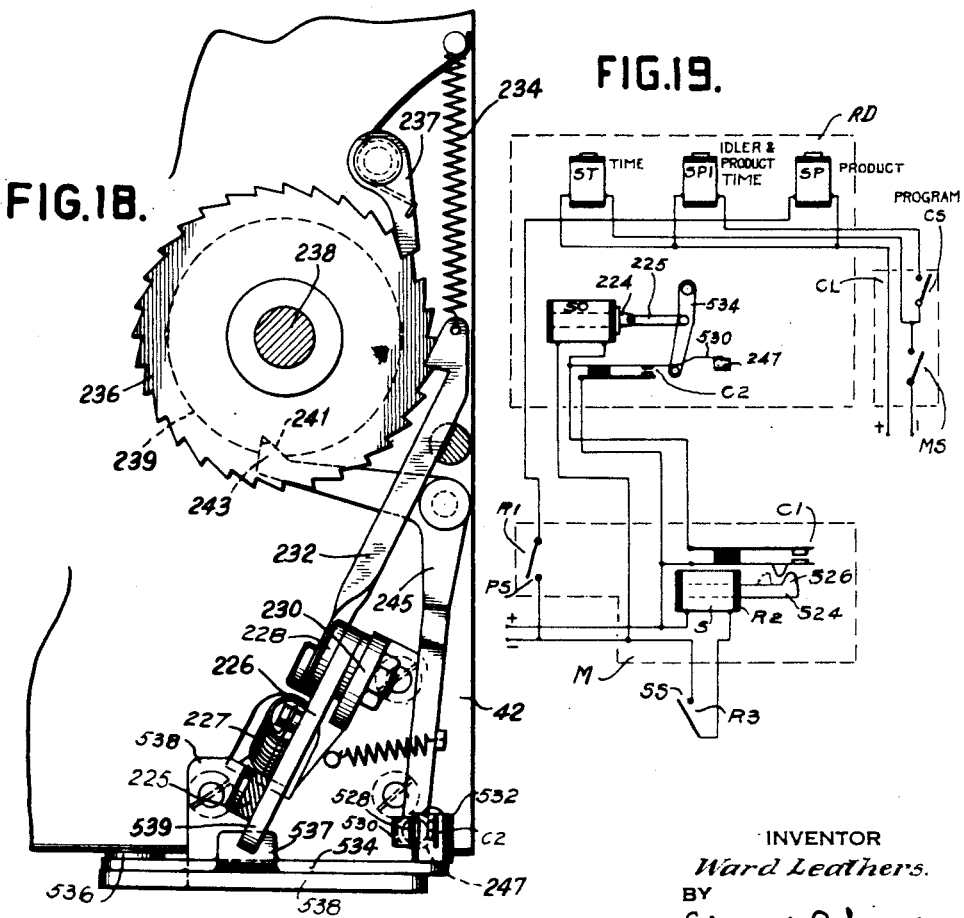
INVENTOR
*Ward Leathers.*
BY
*Edward R. Lowndes*
AGENT Patented Jan. 30, 1951

2,540,033

UNITED STATES PATENT OFFICE 2,540,033

TIME AND PRODUCTION RECORDING APPARATUS

Ward Leathers, Brooklyn, N. Y., assignor to International Business Machines Corporation, New York, N. Y., a corporation of New York Original application February 21, 1945, Serial No. 579,098. Divided and this application February 21, 1947, Serial No. 730,088

3 Claims. (Cl. 346—98)

This application is a division of my copending application, Serial No. 579,098, filed February 21, 1945, now Patent No. 2,469,655, issued May 10, 1949, for Counter Actuating and Resetting Mechanism for Recording Apparatus.

The improved recording apparatus comprising the present invention is primarily adapted for use in connection with factory or shop machines in preparing a complete and accurate record of the production output and the workman's time. The invention, however, is susceptible to modification and the same may be employed for a wide variety of uses. Broadly, however, the apparatus is designed for use in making records throughout a wide range of relationships existing between a lapsed time and speed of operation. Such operation may be the day-to-day operation of a machine for continuously producing a unitary product or a bulk product, and in such an instance the recording apparatus is adapted to render a daily history of the machine by preparing a printed record of the production and of the workman's time. Where a unitary product is concerned, production output will be in terms of units or pieces of work, and where a bulk product is concerned, the production output may be in terms of pounds or other units of weight, cubic feet or other units of measure, feet or other units of length. Apart from its use as a recording device for recording the history of operation of a machine, as described above, the same may be employed as a counter for making a printed record of a number or a value with respect to time, as for example, counting the number of vehicles which pass a given point during any selected period of time, the number of pedestrians entering upon a certain street corner or the like.

The invention has, purely for illustrative purposes, been designed for use in making a complete printed record of the history of daily operation of a particular shop machine. In connection with such use, it is among the objects of the invention to provide a recording device which will make a printed record indicating the total number of pieces produced by the machine over any selected period of time, the time during which the machine is idle and the reason for such idleness, the identity of the operator of the machine, or both.

Another object of the invention is to provide a recording device of this character which will readily permit entering into the machine and printing on the printed record any desired extraneous data, apart from the data furnished by the printing mechanism, as for example, data concerning the identity of the set-up man, foreman, inspector or other persons who may, at various times during the day, stop at the machine.

A still further object of the invention is to provide a relatively simple, economical recording device of this character which may be located in the vicinity of the machine or at a point remote from the machine, as for example, in the manager's office or at a central station.

Still another object of the invention is to provide a recording device which may, if desired, in addition to the recording of other data, as described above, record the total production time of the machine for each daily period and the total machine output.

Other objects and advantages of the invention will be set forth in detail subsequently, but in order that these may be more clearly understood, it is stated that, briefly, the machine involves in its general organization a series of printing wheels or counters which are arranged in groups for cumulatively counting various items, periods of time or the like. These counters have associated therewith a certain Geneva drive mechanism for actuating or periodically indexing the same. Means are provided for actuating these counters either at definite time intervals or according to machine production, and means are also provided whereby certain of these wheels may automatically be reset to zero, while manual means are provided whereby others of these groups of wheels may be reset to their zero readings.

Another object of the invention is to provide a recording device having associated therewith means for resetting certain groups of printing wheels automatically and for resetting other groups of printing wheels manually when desired, together with means for preventing over-carrying of the manual resetting operations to insure that at the completion of such resetting operations all of the wheels associated therewith will be returned to their zero settings.

Another object of the invention is to provide an apparatus of this character having plural groups of printing wheels, together with means whereby a single actuating instrumentality, which may be an electromagnet, is employed for the operation of two or more groups of counters either simultaneously or alternately.

Another object of the invention is to provide a recording apparatus of this character in which the records are printed upon a continuous strip of paper issuing from a roll and wherein, if desired, the paper may be fed outwardly from the machine where it is readily visible for inspection or whereby it may be allowed to accumulate, while at the same time be concealed within the machine.

Another object of the invention is to provide a novel type of actuating mechanism for recording machines of the general character set forth about wherein in place of the usual electric motor there is provided an extremely compact and efficient electromagnetic drive for actuating the various counters, Geneva drive therefor, resetting mechanism, printing mechanism, paper and ribbon feed, etc.

Convenience of arrangement of parts, extreme compactness, which is conducive toward the provision of a machine of small proportions, ruggedness and durability are further desirable features that have been borne in mind in the production and development of the present invention.

Other objects of the invention will be pointed out in the following description and claims and illustrated in the accompanying drawings, which disclose, by way of example, the principle of the invention and the best mode, which has been contemplated, of applying that principle.

In the drawings:

Fig. 1 is a front elevational view of a recording apparatus constructed in accordance with the principles of the present invention.

Fig. 2 is a fragmentary side elevational view of the machine showing a manual resetting control therefor.

Fig. 3 is a side elevational view of the machine.

Fig. 4 is a fragmentary plan view of a record sheet which has been operated upon by the machine.

Fig. 9 is an enlarged detailed sectional view taken substantially along the line 9—9 of Fig. 6.

Fig. 10 is a sectional view taken substantially along the line 10—10 of Fig. 9.

Fig. 11 is a sectional view taken substantially along the line 11—11 of Fig. 9.

Fig. 12 is a sectional view taken substantially along the line 12—12 of Fig. 9.

Fig. 17 is a sectional view taken substantially along the line 17—17 of Fig. 8.

Fig. 18 is a sectional view taken substantially along the line 18—18 of Fig. 8.

Fig. 19 is a diagrammatic view showing the electrical input connections for the recording apparatus.

In all of the above described views like characters of reference are employed to designate like parts throughout.

Figure 5:
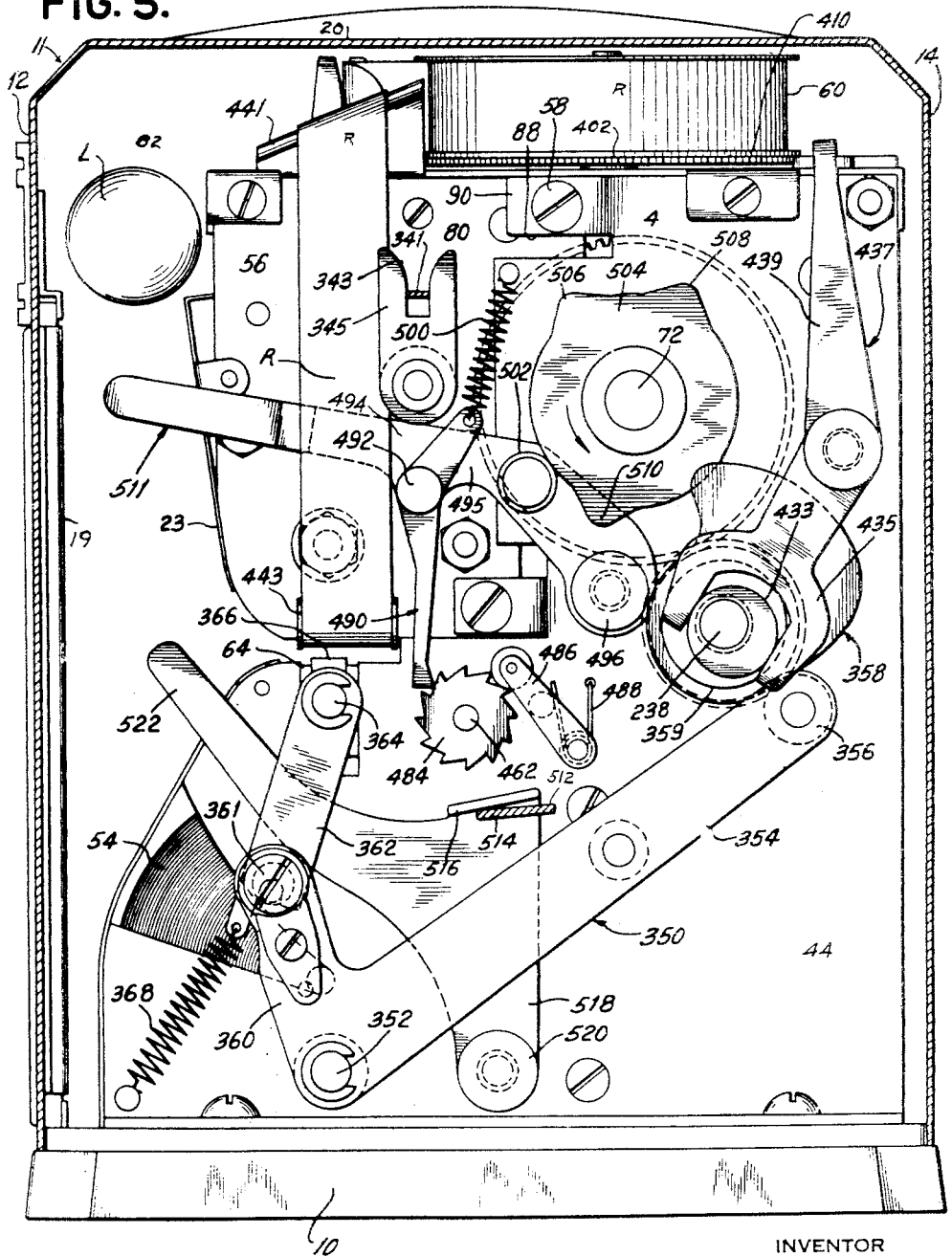
Fig. 5 is a sectional view taken substantially along the line 5—5 of Fig. 1.

The recording device is shown in its entirety in Fig. 1. This device may be attached to any type of machine or it may be used in any desired location, as for example, at a workman's bench where it is desired to secure accurate production and time records. The device need not necessarily be installed directly at the scene of operations and, if desired, it may be installed at a central station remote from the particular machine with which it is associated. In such an instance, the device might comprise one of a number of similar devices for keeping a record of the operations of a plurality of shop machines.

Before explaining fully the details of construction of the recording device, a brief description of the various functions which it is adapted to perform will be given. In modern factory organization or shop practice it is of prime importance to keep accurate records of the number of pieces produced by any particular machine. The present recording device, therefore, includes a counting mechanism which may be actuated by impulses received from a circuit maker and breaker associated with the shop machine. Such circuit makers and breakers are well known in the art and are of various types and it is deemed unnecessary to illustrate or describe any specific circuit maker or breaker in the present instance. The present recording device includes a counting mechanism which is operated by means of impulses and which keeps an accurate record of the running time of the particular machine with which it is associated. The record of the running time of the machine is kept both as to total time, during which the machine operates over any given period, and a sub-total of the running time which may automatically be reset to its zero reading at any particular time.

A still further record which is kept in modern shop practice is a record of the idle time for any particular machine. The present recording device is also provided with a series of counters which will record such idle time both as to total time and as to sub-totals.

All of the counter mechanisms above referred to are of the printing type in that they are adapted to cooperate with a record sheet in printing their various records. Records of production time and of idle time of the machine are made with reference to actual clock time and, as a consequence, an additional series of counters, also operable upon reception of electrical impulses, are provided and are adapted to receive their impulses from a conventional type of clock mechanism.

In order that the identity of any particular workman operating a particular machine or the reason for the idle time of the machine may be recorded, a single manually settable printing wheel is provided. This printing wheel, together with all of the previously mentioned automatically operable wheels, is adapted to render printed records on a record sheet in a readily understandable, legible, single line of type.

Means for further providing for advancing the record sheet to accommodate successive printing operations so that at the end of each day a history of the operation of the machine will be available from the printed sheet record sheet.

Printing may be initiated when the monitored machine or production begins or ceases, or printing may be initiated at fixed intervals of time by impulses from an external program mechanism (not shown) associated with a master clock.

From the above brief description it will be seen that the present apparatus may eliminate the necessity of a time card system. The workman's time, as well as the history of operation of the machine itself, both as regards its production time, its idle time and the amount of production, are all available in convenient form on the printed record sheet at the end of any desired period of operation.

Referring now to the drawings in detail and in particular to Figs. 1, 2 and 3, the apparatus involves in its general organization a base plate 10 on which there is removably supported an outer machine casing or cover 11 including a front wall 12, a rear wall 14, side walls 16 and 18 respectively, and a top wall 20. The front of the casing is open and is adapted to be closed by a horizontally swinging door 19 having a transparent window 22 formed therein through which there is visible certain indicia and certain printing and counting mechanism, the nature of which will be made clear presently. The operative instrumentalities of the machine are adapted to be enclosed within the casing or cover just described and certain manual control devices are positioned on the outside of the casing and have mechanical lead-in connections to the interior mechanism of the device, all in a manner subsequenty to be described.

An indica plate 23 (Figs. 1 and 6) is suitably positioned immediately behind the window 22 in the upper regions thereof and a backing plate 25 is positioned behind the window adjacent the lower regions thereof. The two plates just referred to form therebetween an elongated horizontal slot 27 through which there is visible the indicia which are formed on the individual print wheels 24 of a plurality of print wheel groups, of which there are seven in number, these groups being designated individually in their entirety at 26, 28, 30, 32, 34, 36 and 38, as shown in Figs. 1, 7 and 9. The left-hand group of print wheels 26 are indicative of chronological time, the extreme left-hand print wheel representing days of the week and a. m. and p. m. divisions thereof, the next adjacent print wheel representing hours of the day, and the next two adjacent print wheels being representative of the minutes during each hour. The group of print wheels 28 represents the number of minutes of time during which the particular machine, with which the recording device is associated, is in actual operation or production. The group of print wheels 30 represents an accumulation or totaling of previously encountered periods of production time. In other words, the group 28 contains three print wheels and indicates a sub-total of production time, while the group 30 contains four print wheels and indicates totals of production time. The first of these two groups has associated therewith means for automatically returning the print wheels to their zero reading after a certain predetermined period of time has elapsed and the latter group has associated therewith means whereby the print wheels may manually be reset to their zero reading.

The groups of print wheels 32 and 34 are similar in their design and operation to the groups 28 and 30 just described. The first of these latter two groups contains three print wheels that are representative of sub-totals of idle time and the second group is representative of total minutes of idle time.

The group of print wheels 36 and the group of print wheels 38 respectively are possessed of three and four print wheels. The group 36 represents sub-total production, while the group 38 represents total production. The former of these two groups is adapted to be automatically reset to zero simultaneously with the resetting of the groups 28 and 32, while the group 38 is adapted to be manually reset to zero simultaneously with the resetting of the groups 30 and 34. A single print wheel 40, shown at the extreme right-hand side of Fig. 1, is capable of being manually set to various positions that are representative of special data, as for example, data relating to the identity of a particular workman, to the reason for machine idle time, or to any special circumstance that may be encountered during the machine operation.

In Fig. 4 there is shown a fragmentary portion of a record sheet which has been operated upon by the various groups of print wheels whose accounting functions have been briefly outlined above. It is to be noted that the printing on this record sheet is made a line at a time, and that the various lines of printing occur in groups of two lines each which are separated from each other by a space equivalent to the width of a single line of print. The first line in each group, reading from the bottom of the sheet upwardly, is printed at the commencement of a machine run and the upper line in the group is made at the end of the machine run. As shown in Fig. 4, in the lower line the data in the left-hand column shows that the machine went into operation on Tuesday at 9:45 a. m. A. m. time is distinguished from p. m. time by the presence or the absence of a small underline situated below the second letter of the group of two letters which represent the day of the week. The data just mentioned is effected by the first group 26 of print wheels. The data in the next two columns represents sub-total production time and total production time and, since at the time of setting the machine into operation no production time has existed previously, this data in the two columns shows 000 and 0000 respectively.

The data appearing in the next two columns which represents sub-total and total minutes of idle time shows 127 minutes and 105 minutes respectively. This data is predicated upon the fact that the working day commences at 8:00 a. m. and, since the machine did not go into operation until 9:45 a. m., the total column will show 105 minutes of idle time existing before the machine began its operation. The presence of the number 127 in the sub-total column is explained by the fact that if 5:00 p. m. was the end of the previous working day, the foreman, inspector or other operator throwing the master switch to shut off the recording apparatus did not do so until 5:22 p. m. or twenty-two minutes after the end of the working day. These additional twenty-two minutes thus accumulated in the machine remained therein overnight and showed up on the printed record at the time the machine was set into operation. The data in the next two columns which represents machine production appears as 000 and 0000, for obviously no production could be effected before the machine was set into operation.

The data appearing in the last column, which is in the form of the letter H, is of a symbolic nature and this letter may represent any desired data, as for example, the reason for any idle time that may have accrued in the idle time columns during the course of the day. It is to be noted that small size capital letters "A" and "B" appear at the right-hand side of the total running time column and sub-total idle time column respectively. These symbols may, if desired, designate the identity of the production machine to which the recording apparatus is applied. As will appear presently, the various counters are mounted on a common shaft and may conveniently be removed for replacement purposes in the event the recording apparatus is applied to a different production machine. It is to be noted that since sub-total production time, sub-total idle time and sub-total production data are automatically reset to zero at the end of each printing operation, and since total production time, total idle time and total production data are manually set to zero at the proper time, the data in the six columns relating to production time, idle time and production will be reset to zero when the master switch is thrown at the end of each working day, although no print of this fact will be made on the record sheet. The difference in time expressed in minutes existing from the commencement of a working day until the commencement of machine operation will show up in the total column for idle time. This same number of minutes will be cumulatively entered into the sub-total column for idle time, together with the number of minutes existing between the end of the previous working day and the time at which the master switch was thrown.

Figure 6:
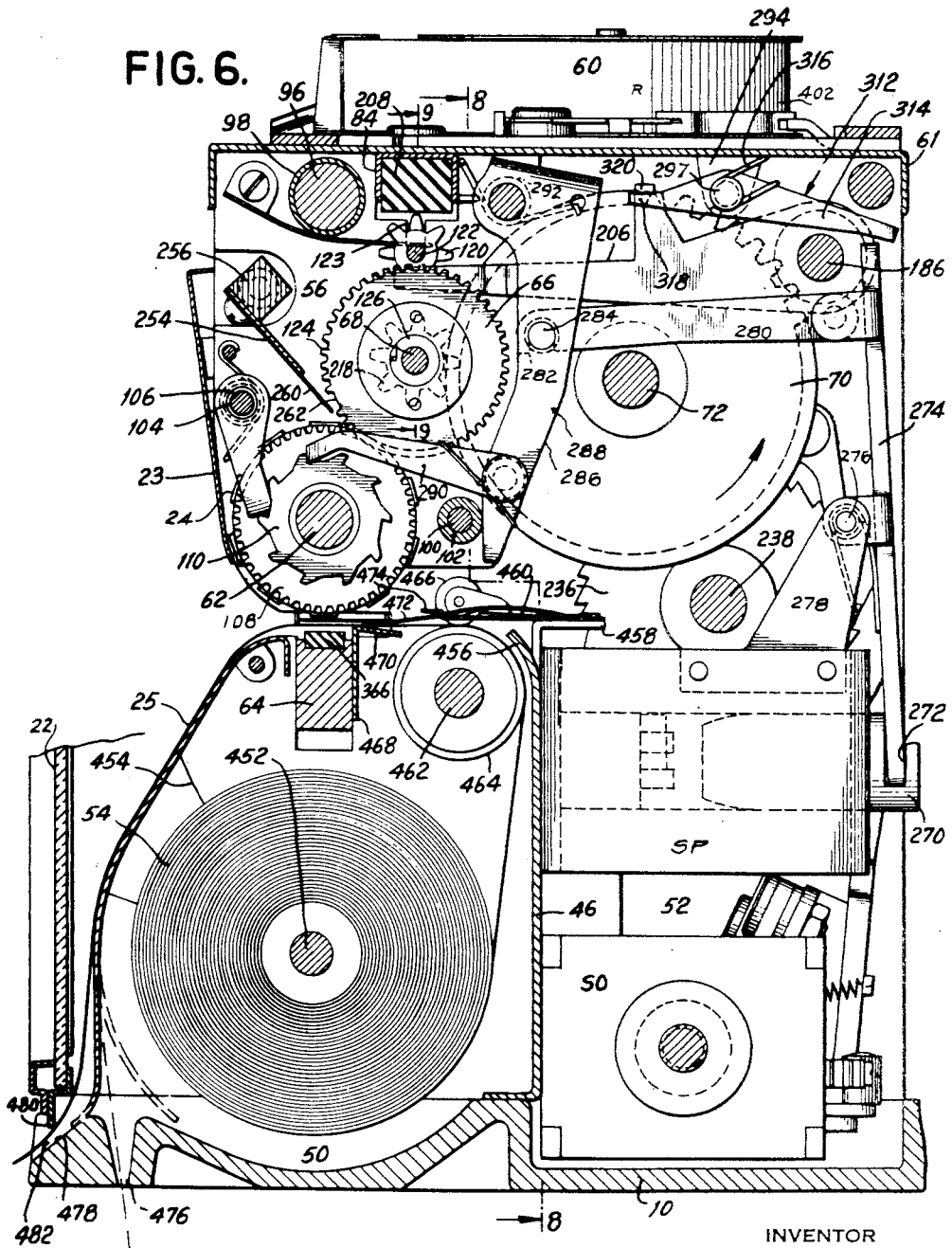
Fig. 6 is a sectional view taken substantially along the line 6—6 of Fig. 1.
Figure 7:
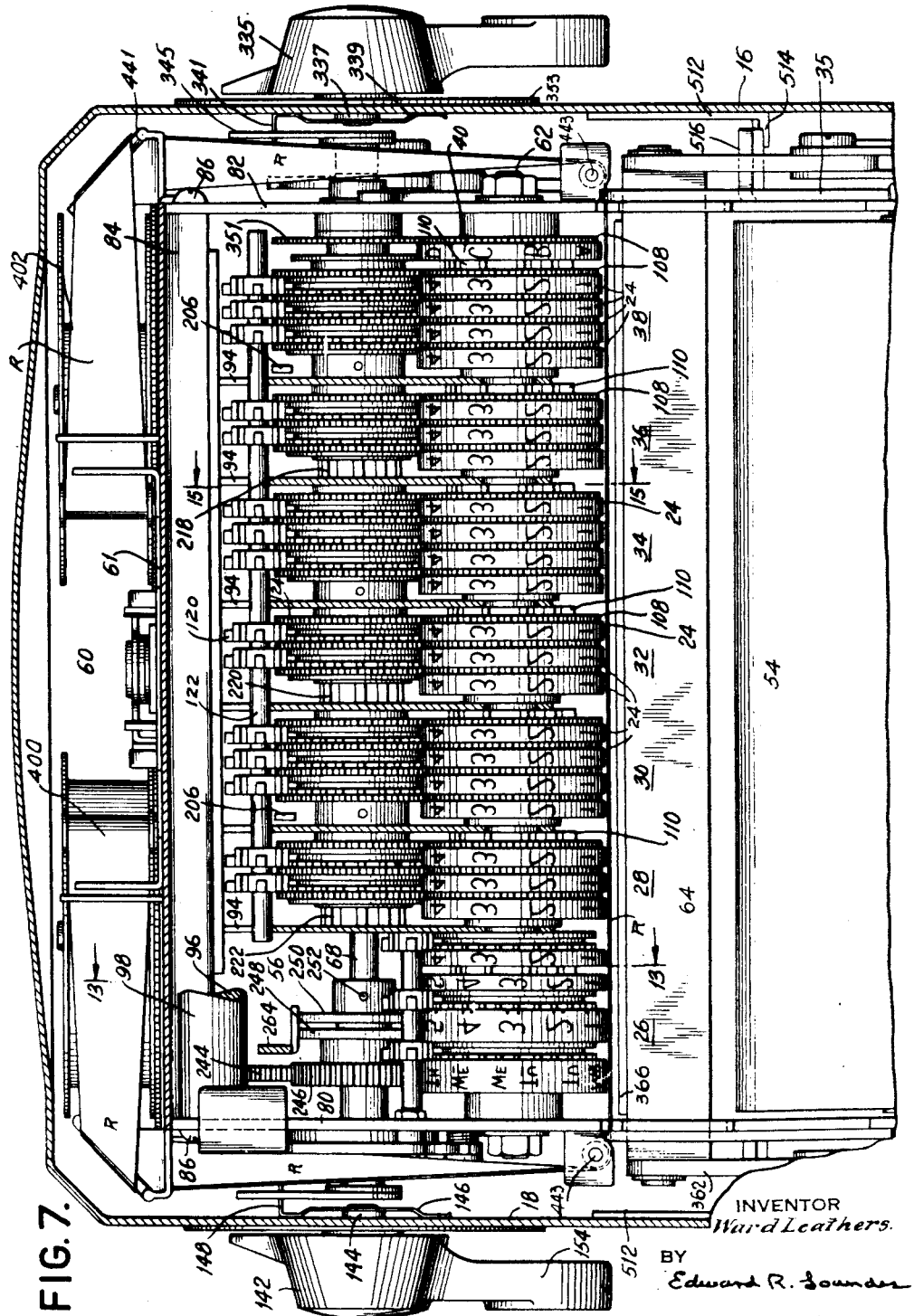
Fig. 7 is a front elevational view of a printing counter assembly employed in connection with the present invention showing its operative association in the machine.
Figure 8:
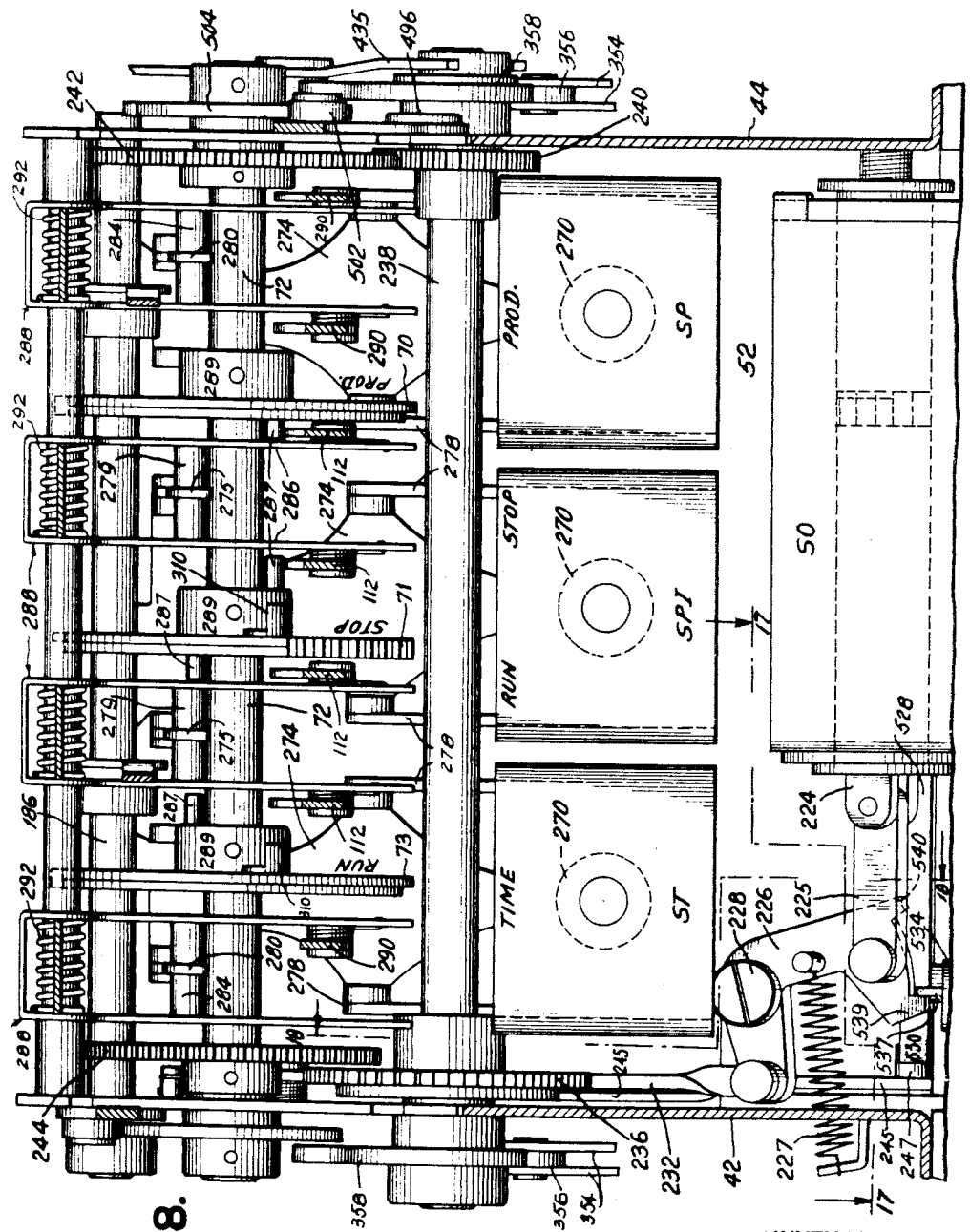
Fig. 8 is a sectional view taken substantially along the line 8—8 of Fig. 6.

Referring now to Figs. 6 and 8, a pair of side plates or standards 42 and 44 extend upwardly from the base plate 10 and serve to support therebetween a major portion of the operative internal machine instrumentalities. A vertical transverse center plate or partition 46 is supported at its lower end on the base plate 10 and extends between the two side plates 42 and 44 medially thereof. The plate 46 serves to divide the lower region of the apparatus into a front paper storage compartment 50 and a rear solenoid-containing compartment 52, the former compartment being adapted to enclose a roll 54 of blank record media and the latter compartment serving to enclose a plurality of solenoids, the nature and function of which will be set forth presently. The previously described print wheel groups are operatively associated with a removable counter assembly 56 which is slidably received between the two side plates 42 and 44 and is adapted to be anchored in position therebetween by means of securing screws or the like 58 (see Fig. 5). A removable ribbon assembly 60, the nature of which will be described subsequently, is mounted on a bottom plate 61 and is adapted to be retained in position on the upper end of the side plates 42 and 44.

The various print wheel groups are mounted upon a horizontal shaft 62 operatively associated with the removable counter assembly 56, and these print wheels occupy positions in alignment adjacent the bottom of the assembly 56 and are designed for cooperation with a movable print bar 64, which is positioned immediately therebeneath and which is adapted to be moved from a lower inoperative position out of pressing engagement with the print wheels to an upper operative position. The manner in which the record media material issuing from the roll 54 is conducted over the upper surface of the print bar 64 and the manner in which the ribbon associated with the ribbon assembly 60 is passed between the print wheels and the record media material will become apparent when the various separate features of the invention are singled out for individual description. The various print wheel groups carried on the shaft 62 have associated therewith a counter mechanism 66 (see also Fig. 9) associated with the counter assembly 56 and whereby the individual print wheels 24 may be periodically advanced.

The counter mechanism 66 is mounted upon a shaft 68 and in turn has associated therewith a plurality of reset gears 70, 71 and 73 (Figs. 6, 8 and 15) mounted on a shaft 72 extending between the side plates 42 and 44. This latter counter mechanism 66, together with the reset gear assembly, will also be described in detail as the separate features of the invention are set forth.

Referring now to Figs. 5 to 12 inclusive wherein the removable counter assembly 56 is best illustrated, this assembly includes a pair of end plates 80 and 82 which are in part maintained in spaced relationship by means of an inverted U-shaped channel member 84 to which the plates 80 and 82 are secured by means of screws or the like 86 (Figs. 6 and 7). When the counter assembly 56 is in position within the apparatus, the end plates 80 and 82 are adapted to occupy the same planes as the two side plates 42 and 44. Toward this end, the plates 42 and 44 are recessed as at 88 to accommodate reception of the assembly 56 and are provided with offset portions 90 which overlap the end plates 80 and 82 and through which offset portions the securing screws 58 are adapted to pass.

A plurality of rigid partition plates 94 are maintained in spaced relationship between the two end plates 80 and 82 by means of a plurality of spacer bar assemblies, of which there are three in number. One of these assemblies includes a supporting rod 96 (Figs. 6, 7 and 13) on which there are mounted a plurality of spacer sleeves 98 that extend between the various partition plates 94 and between the two end partition plates and the end plates 80 and 82, thus assisting in rendering the partition plates and side plates a rigid structure. Another spacer bar assembly includes a supporting rod 100 and spacing sleeves 102, while still a third spacer bar assembly includes a supporting rod 104 and spacing sleeves 106. It will be seen, therefore, that the end plates 80 and 82 and the various partition plates 94 are all maintained in fixed rigid relationship with respect to each other and are supported from each other along three longitudinal axes, as described above.

Referring now to Figs. 6, 7, 9 to 13 inclusive, the print wheel assembly which, as previously set forth is supported upon the shaft 62, includes the various groups of print wheels 26 to 38 inclusive and each of these print wheels 24 has associated therewith a driving gear 108. Each print wheel 24 and its driving gear 108 is mounted for independent rotation upon the print wheel shaft 62 and is adapted to be driven or indexed from the counter mechanism 66 in a manner that will now be set forth. The right-hand print wheel 24 and its driving gear 108 of each of the groups 26 to 38 inclusive has associated therewith an indexing ratchet gear 110 which derives its motion from a pawl drive mechanism including a pawl 112 in the case of each of the groups 28 to 34 inclusive, and a pawl 290 in the case of the groups 26, 36 and 38. Motion is thus transmitted directly to the first or right hand print wheel in each group up to the counter mechanism 66 and from thence back again to the remaining print wheel in each group. In other words, the right-hand print wheel assembly 24, 108, 110, constitutes a driving unit for its respective section of the counter mechanism 66 and this section of the counter mechanism, acting through a more or less conventional Geneva drive system, operates to conduct carry-over indexing operations to the remaining print wheel assemblies in its respective group.

Still referring to Fig. 7, and also to Figs. 9 to 12 inclusive, the counter mechanism 66 includes a plurality of Geneva drive gear groups corresponding in number to the print wheel groups 28 to 38 inclusive and similarly designated at 28' to 38' inclusive. These latter Geneva drive gear groups, with the exception of a novel form of reset device, are conventional in their design and include the usual guide locking discs 114 (Figs. 9 and 10), impulse disc 116 and receiving gear 118, each group of three elements cooperating in a conventional manner with a respective Geneva carry-over gear 120. The various Geneva carry-over gears are loosely disposed upon a Geneva gear supporting shaft 122 loosely supported in slots 123 (see Fig. 6) formed in the various partition plates 94. Each unit of each section of the counter mechanism 66 also includes a transfer gear 124 by means of which motion is transferred to the various print wheel driving gears 108 to effect cumulative numerical carry-over operations for printing purposes.

While the mechanism, structure and function of the counter mechanism 66 remains similar to conventional Geneva carry-over systems, the present invention includes a novel form of resetting mechanism for the print wheels 24 contained in the groups 30, 34 and 38 which are the production time total, idle time total, and production total groups. The production time sub-total, idle time sub-total and production sub-total groups 28, 32 and 36 respectively have provision for automatic resetting operations, as will be described subsequently.

The counter units 114, 116, 118, 124, of each of the sections 30', 34' and 38' are loosely disposed upon sleeves 126 which are pinned as at 128 to the shaft 68. The counter units 114, 116, 118, 124 of the counter groups 28', 32' and 36' are loosely disposed upon sleeves 130 which are not pinned to the shaft 68 and which may, consequently, turn loosely thereon so that manual resetting operations associated with the other counter groups do not affect these former groups.

Referring now to Figs. 10, 11 and 12, each of the pairs of transfer gears and guide lock discs 124, 114 in each of the assembly units 114, 116, 118, 124, is provided with a pair of aligned openings 132, which openings communicate through slots 134 with the central opening of the unit. All of the sleeves 126 are formed with a longitudinally extending recess or slot 136 coextensive therewith and have a shoulder 138 associated therewith. A loop spring 140 of a width equal to the width of the two members 124, 114 is seated within the opening 132, as shown in Fig. 10, and has one end thereof projecting through the slot 134 and adapted to bear against the outside surface of the sleeve 126. As shown by the arrow in Fig. 10, the unit 114, 116, 118, 124 during indexing operations is adapted to move in a clockwise direction so that the projecting end of the spring 140 in traveling around the periphery of the sleeve 126 or 130 may ride over the shoulder 138, into the recess 136 and travel unobstructed outwardly from the recess onto the smooth side of the sleeve. The counter unit is thus capable of continued intermittent turning-movement in the direction of the arrow unobstructed by the sleeve 126.

For resetting operations, means are provided whereby each of the sleeves associated with the total groups 30, 34 and 38 may be manually turned throughout one complete revolution in the same direction of rotation as that of the counter units so that the shoulder 138 will engage the projecting end of the spring 140 and bring all of the counter units to their zero positions. The various sleeves 130 associated with the sub-total units are also recessed longitudinally and the various elements 124, 114 are likewise formed with openings 132 having springs 140 disposed therein. However, since the sleeves 130 are not pinned to the shaft 68, manual resetting operations are precluded as far as these assemblies are concerned. Means are provided, however, whereby these latter sleeves are automatically rotated on the shaft 68, while the latter remains stationary in order to effect automatic resetting operations.

The means for manually resetting the totals groups of print wheels 30, 34 and 38 is best illustrated in Figs. 1, 2, 7, 9 and 14. Referring now specifically to Figs. 2 and 7, a manual reset knob 142 is rotably mounted on the side wall 18 of the cover member and is provided with a shank 194 which projects through an aperture in the side wall. A spring member 146, which is riveted to the shank 194, is provided with an inturned finger 148 adapted to project through a slot 150 formed in a bifurcated actuator 152 mounted on the extreme left-hand end of the shaft 68, as viewed in Figs. 7 and 9. The reset knob 142 is provided with a finger piece 154 having a finger hole 156 formed therein for convenience of manipulation of the knob 142. By virtue of the fact that the sleeves 126 of the totals counter assemblies 30', 34', 38', are pinned to the shaft 68 as at 128 and by virtue of the spring and slot arrangement 140, 136, previously described, it will be seen that upon turning movement of the knob 142 in the direction indicated by the arrow in Fig. 2 through one full revolution, the various counter units 114, 116, 118, 124 will be reset and brought to positions of orientation wherein the print wheels 24 are all restored to their zero settings.

Figure 14:
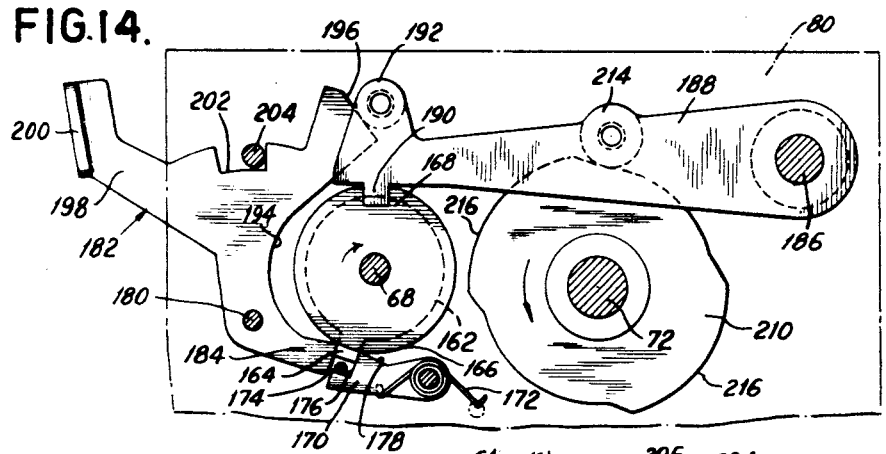
Fig. 14 is a sectional view taken substantially along the line 14—14 of Fig. 9.

Referring now to Figs. 9 and 14, means are provided for preventing rotation of the knob 142 throughout an angle greater than that sufficient to restore the print wheels to their zero settings, thus over-running of the zero setting during resetting operations is precluded. Toward this end, the shaft 68 has mounted thereon and pinned thereto as at 158 a sleeve 160 to which there is secured in any suitable manner, as for example, by spot welding, a circular member 162 having formed thereon a stop finger 164. Also secured to the sleeve 160 is a second cam member 166 having a slot 168 formed in the periphery thereof. The sleeve 160, cams 162 and 166, and actuator 152 all comprise one unitary rigid structure which is mounted on and rotatable with the shaft 68. Pivotally secured to the end plate 88 is a stop pawl 170 which is spring-pressed as at 172 against a stop pin 174 and which is provided with a shoulder 176 designed for engagement with one edge of the stop finger 164 when the shaft 68 is in its position of zero setting for the print wheels 24. The pawl 170 is provided with a cam surface 178 by means of which it is retracted when the stop finger 164 approaches the limit of its movement in the direction indicated by the arrow in Fig. 14. Pivoted as at 180 to the end plate 80 is a combined stop and release member 182 having an abutment arm 184 formed thereon and normally positioned in the path of movement of the stop finger 164, as shown in Fig. 14. It will be seen that upon rotation of the cam member 162, in the direction of the arrow, the stop finger 164 will ride over the cam surface 178 to retract the pawl 170 until such time as it moves into position just behind the shoulder 176. As the finger 164 assumes this latter position, it will be engaged by the abutment arm 184 and further rotation of the cam 162, and consequently of the shaft 68, will be prevented. Reverse movement of the cam 162 in a counter-clockwise direction, as seen in Fig. 14, and consequent reverse movement of the shaft 68, will be prevented by virtue of the shoulder 176 formed on the pawl 170. Thus the cam 162 will be securely locked against continued rotation or against reverse rotation after resetting operations have been completed.

Pivoted on a rock shaft 186 is a retaining pawl 188 having a retaining finger 190 formed adjacent its outer end and also having a cam roller 192 mounted on this latter end. The combined stop and release member 182 is provided with an arcuate cam surface 194 and an inclined straight cam surface 196, the former being designed for cooperation with the stop finger 164 and the latter being designed for cooperation with the cam roller 192. The member 182 is further provided with an actuating lever 198 having a finger piece 200 formed thereon. A slot 202 formed in the member 182 has extending thereinto a limit pin 204 which projects outwardly from the end plate 80. It will be seen, therefore, that the member 182 is movable from an initial position, wherein the finger 164 is securely held between the abutment arm 184 and shoulder 176 and wherein the finger 190 of the retaining pawl 188 is disposed in the slot 168, to an advanced position wherein the abutment arm 184 is withdrawn from the path of movement of the stop finger 164 and wherein the retaining pawl 188 becomes elevated by virtue of the engagement of the inclined cam surface 196 with the cam roller 192. With the various parts in the respective positions just described, it will be seen that the cam member 162, and consequently the shaft 68, is free for clockwise rotation throughout one complete revolution, as shown in Fig. 14. The retaining pawl 188 forms one element of a Geneva gear elevating mechanism, and, as will be described presently, this pawl member must be elevated during both manual resetting operations of the total print wheels 30, 34 and 38 and during automatic resetting operations of the sub-total print wheels 28, 32 and 36.

Obviously, no resetting operations of either the total or sub-total print wheel groups could be effected without removing the Geneva carry-over gears 120 from operative engagement with the various counter assemblies. Provision is herein made for so removing the Geneva gears 120 and provision is further made during such removal for maintaining the individual Geneva gears properly oriented so that after all resetting operations have been completed the entire Geneva gear assembly may again be lowered into engagement with the counter assemblies in proper meshing condition. Toward this end, the shaft 186, which is supported between the end plates 80 and 82 and which carries the retaining pawl 188, has mounted thereon a pair of arms 206, the outer ends of which underlie the Geneva shaft 122, as clearly shown in Figs. 6, 7 and 9. It will be seen that upon elevation of the retaining pawl 188 of Fig. 14, the rock shaft 186 will be turned about its axis in a clockwise direction, as viewed in Figs. 6 and 14, and the elevating arms 206 will be caused to engage the underneath surface of the Geneva gear shaft 122 to elevate the same in the slots 123 and cause the various Geneva gears 120 to be lifted out of engagement with the respective carry-over gears with which they are associated.

All printing operations by the print wheels 24 are conducted when these print wheels are in definite positions of registry with the print bar 64 and, consequently, during reset operations each of the Geneva gears 120 will assume a definite position of orientation wherein one tooth thereof extends vertically, as shown in Fig. 6. In order to maintain the various Geneva gears 120 properly oriented for restoration to their respective counter assemblies, the previously mentioned inverted U-shaped channel member 84 serves to retain within the channel portion thereof an elongated resilient retaining pad 208. While this pad may be formed of any suitable material, the same is preferably formed of soft rubber in order that the teeth of the Geneva gear may readily become embedded therein. The pad 208 directly overlies all of the Geneva gears 120 and the slightest elevation of the Geneva shaft 122 will bring immediate engagement between this pad and the Geneva teeth. Thus it will be seen that the Geneva gears are engaged before they have cleared the counter wheel assemblies and by the time they finally do clear these counter wheel assemblies, they are so embedded in the soft rubber pad 208 that there is no possibility of their becoming misaligned.

Referring now to Fig. 14, automatic resetting operations of the sub-total print wheel groups 28, 32 and 36 is effected at definite intervals of time by means of a rotary cam 210 mounted on the previously mentioned reset shaft 72. A description of the manner in which automatic reset operations take place from the shaft 72 will follow immediately. However, it is deemed pertinent at present to state that during such automatic resetting operations the retaining pawl 188 must be elevated to cause tilting movement of the shaft 186 and consequent elevation of the Geneva gear assembly as just described. Toward this end, the retaining pawl 188 has mounted thereon a cam roller 214 designed for engagement with the cam 210. The cam 210 is provided with two cam protuberances 216 arranged 180° apart so that twice during each revolution of the shaft 72 the retaining member 188 will become elevated. During elevation of the retaining member 188 by the cam 210, the cam roller 192 will move out of engagement with the inclined cam surface 196 of the combined stop and release member 182 without disturbing the position of the latter.

Automatic resetting of the sub-total print wheel groups and counter assemblies is effected by virtue of the three reset gears 70, 71 and 73 (Fig. 8) which are mounted on the shaft 72. These three reset gears are designed for cooperation with respective pinions 218, 220 and 222 (Figs. 7 and 9) associated with the sub-total groups 36, 32 and 28 respectively and mounted on and rotatable with the sleeves 130 of these assemblies. The reset gears 70 and reset pinions 218, 220 and 222 constitute conventional reverse Geneva gear reset mechanism and it is deemed sufficient to state that the number of teeth provided on each reset pinion corresponds to the number of teeth provided on a segment of the periphery of each of the reset gears so that when a particular segment encounters and completely traverses its respective pinion one revolution of the pinion, and consequently one revolution of the sleeve 130, will occur to reset all of the elements of the respective sub-total counter assembly and of its sub-total print wheel group.

Figure 15:
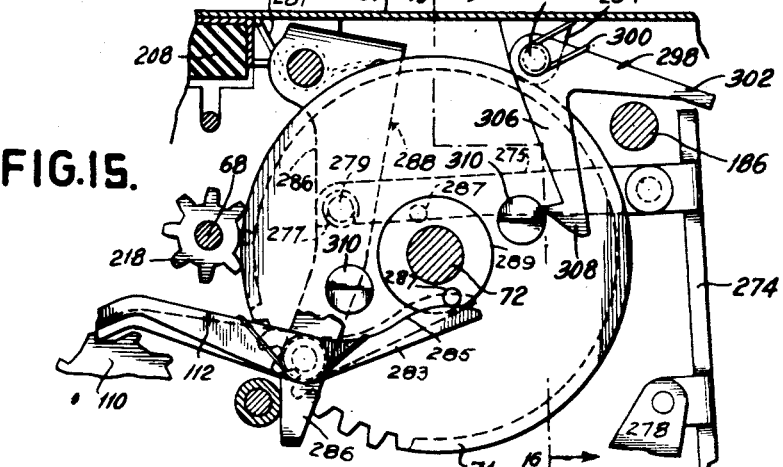
Fig. 15 is a sectional view taken substantially along the line 15—15 of Fig. 7.

Referring now to Figs. 6, 8 and 15, the toothed segment of the reset wheel 71 occurs on this latter gear at a position which is 180° removed from the toothed segments provided on the reset gears 70 and 73. For this reason, simultaneous resetting operations are conducted on the production time sub-total and production sub-total counter mechanisms at a different point in the machine cycle from the single resetting operation of the idle time sub-total counter mechanism. Such dual resetting operation of the production time and production sub-total counter assembly occurs during one-half revolution of the shaft 72, while such single resetting operation of the idle time sub-total counter mechanism occurs during the other half revolution of the shaft 72. Rotation of the shaft 72 throughout one-half revolution is conducted intermittently at predetermined times during the operation of the machine and immediately following printing operations.

The means for intermittently rotating the shaft 72 is best illustrated in Figs. 6, 8, 13, 17 and 18. The compartment 52 serves to house a plurality of solenoids, of which there are four in number, designated at SO, ST, SPI and SP. The solenoid SO constitutes a main operating solenoid whose function is to periodically index the shaft 72 and thus cause printing, resetting, paper advancing, ribbon feeding, Geneva gear elevating and other incidental functional machine operations. The solenoid ST serves to periodically actuate the time group of print wheels 26. The solenoid SPI serves to actuate both the production time print wheels and the idle time print wheels, but not simultaneously, mechanical means being provided whereby when one set of print wheels is being operated upon, the other set thereof remains inoperative. The solenoid SP serves to periodically index the production print wheels 38.

The solenoid SO (Fig. 8) is suitably supported from the partition plate 46 near the bottom of the compartment 52 and is provided with a movable core 224 to which there is pivotally connected one end of a link 225, the other end of which is pivotally connected to one end of a bell crank lever 226 which is spring-biased as at 227. The bell crank lever 226 is pivoted as at 228 to an inclined bracket 230 (Fig. 18) mounted on the side plate 42 and the other end of this lever is pivotally connected to a pawl arm 232, the upper end of which is spring-pressed as at 234 in such a manner that the pawl arm may co-operate with a ratchet wheel 236 mounted on a horizontal shaft 238 extending between the two side plates 42 and 44. The ratchet wheel 236 also has associated therewith a holding pawl 237 to prevent reverse movement thereof. The end of the shaft 228 opposite the ratchet wheel 236 (Fig. 8) has mounted thereon a gear 240 which meshes with a larger gear 242 secured to the shaft 72. Thus it will be seen that upon periodic indexing of the solenoid SO motion will be transmitted through the link 225, bell crank lever 226, pawl arm 232, ratchet wheel 236, shaft 238 and gears 240, 242, to the shaft 72 for resetting operations.

Referring now to Figs. 6, 7, 8 and 13, the shaft 72 carries near one end thereof a gear 244 which meshes with a smaller gear 246 loosely mounted on the shaft 68. The gear 246 is connected to a cam 248 which is positioned on the shaft 68 alongside a similar cam 250. This latter cam, however, is pinned as at 252 to the shaft 68 and consequently is rotatable therewith. The cams 248 and 250 are provided for the purpose of causing an over-throw comb-like member 254 to move into engagement with the various units of the counter mechanism 66 to prevent overthrowing thereof during either manual or automatic resetting operations. Accordingly, a square rock shaft 256 extends between the end plates 80 and 82 (Fig. 6) and has secured to one side thereof the comb-like member 254 which is provided with a series of spring fingers 260 designed for engagement with the various transfer gears 124 of the counter mechanism 66.

It is to be noted that each of the transfer gears 124 has one tooth thereof removed as at 262 (see also Figs. 10 and 12), thus providing in effect a recess designed for reception therein of the extreme ends of the fingers 260 during resetting operations when the transfer gears are so oriented as to cause the print wheels associated therewith to assume their zero indication or setting. The square rock shaft 256 has secured thereto a cam arm 264 (Figs. 7 and 13), the outer end of which is positioned immediately above the two cams 248 and 250 and is designed for camming engagement with either of them upon turning movement thereof. Since the cam 250 is pinned to the shaft 68 and rotates therewith and since the cam 248 is integrally formed with the gear 246, it will be seen that these two cams serve during both manual and automatic resetting operations to bring the comb-like member 254 into engagement with the transfer gears of the counter mechanism immediately after resetting operations have commenced. By virtue of the specific design of the two cams 248 and 250, the comb-like member 254 is adapted to remain in engagement with the periphery of the various transfer gears until such time as resetting operations have been completed.

Since the gear 244 and cam 248 are loosely disposed on the shaft 68, they will remain stationary until such time as they are set into motion by virtue of their connection to the gear 244 which, as was previously described, is operatively connected through a train of mechanical instrumentalities to the solenoid SO. The cam 248, therefore, becomes effective only during automatic resetting operations.

Figure 13:
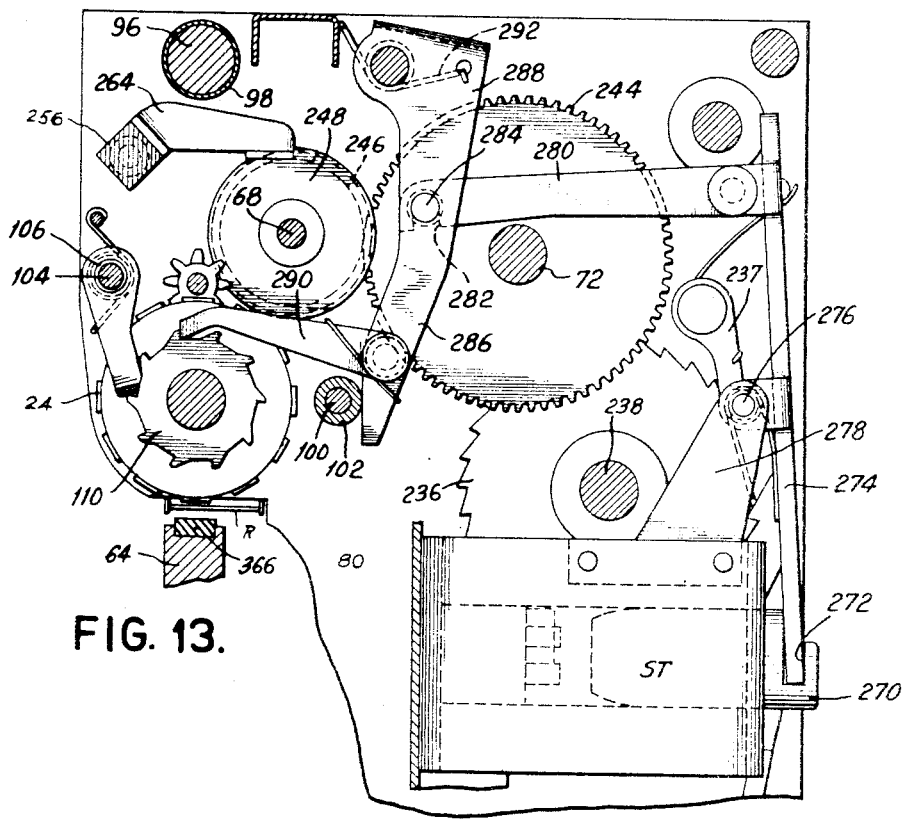
Fig. 13 is a sectional view taken substantially along the line 13—13 of Fig. 7.

It has previously been explained how, during indexing operations of the print wheels 24, motion is transmitted directly to the first or right-hand print wheel in each group, as viewed in Fig. 7, and from thence up to the counter mechanism 66 and back again to the remaining print wheels in each group. The mechanism for periodically indexing the first or right-hand print wheel in the time group 26 and unit production groups 36 and 38 are best illustrated in Figs. 6, 8 and 13. These mechanisms are substantially identical and it is thought that a description of the mechanism which periodically indexes the print wheel of the time group 26 will suffice for a description of the other mechanism. Referring now to these figures, each of the solenoids ST, SPI and SP is provided with a movable core 270, the outer end of which is slotted as at 272 and receives therein the lower end of an oscillatable operating lever 274 which is pivoted as at 276 medially of its ends to a bifurcated bracket 278 suitably mounted upon its respective solenoid. The upper end of the lever 274 has pivotally connected thereto a link 280, the free end of which is provided with a notch 282 in its underneath side adapted to receive therein a horizontal strut 284 carried between the parallel arms 286 of a swinging U-shaped cradle 288. As shown in Fig. 8, four such cradles 288 have been provided, the extreme left-hand cradle serving to accommodate the time solenoid ST, the two central cradles serving to accommodate the production and idle time solenoid SPI and the extreme right-hand cradle serving to accommodate the production solenoid SP. The arm 286 of the cradles 288 associated with the time print wheel groups 26 and the arms 286 associated with the unit production groups 36 and 38 each has pivotally connected thereto adjacent its lower end a spring-pressed pawl 290 designed for engagement with a respective indexing gear 110 in the groups just mentioned. Each of the cradles 288 is spring-pressed or biased as at 292 in such a manner as to cause the same to be moved to an advanced position, thus retracting the core 270 of its respective solenoid. The impulses received by the various solenoids are of momentary duration and immediately upon energization of each solenoid the core is retracted against the action of the spring 292, thus retracting the cradle 288 and pawl 290. Immediately thereafter, when the impulse applied to the solenoid has been dissipated, the pawl 290 under the action of the spring 292 moves forwardly to perform the indexing operation.

The mechanism for periodically indexing the first or right-hand print wheel in the sub-total and total idle time groups 28 and 30 and in the sub-total and total production time groups 32 and 34 is similar in each instance and one such mechanism is shown in Fig. 15. This mechanism specifically is the one which serves to index the first print wheel in the total print wheel group 34 of the two production time groups 32, 34. The oscillatable operating lever 274 associated with the solenoid SPI has pivotally connected thereto at its upper end a link 275 similar to the link 280 of Fig. 13, the free end of which is provided with a notch 277 adapted to receive therein a horizontal strut 279 carried between the parallel arms 286 of the cradle 288 which is associated with this particular set of instrumentalities. The lower end of each arm 286 of this particular cradle and of the cradle associated with the sub-total and total idle time groups 28 and 30 carries a spring-pressed pawl 112 designed for engagement with a respective indexing gear 110 associated with the print wheel groups 28, 30, 32 and 34. Each of the cradles just mentioned is spring-pressed or biased as at 281 in such a manner as to cause the same to be moved to its advanced position, thus advancing the core 270 of its respective solenoid. The indexing operation thus takes place in a manner similar to that described in connection with the indexing of the time and unit production print wheel groups.

The rear end of the pawl 112 has formed thereon an extension 283 provided with a cam surface 285 designed for engagement with a pin 287 (Figs. 8 and 15) formed on a collar 289, of which there are three in number and all of which are mounted on the shaft 72 in the vicinity of their respective reset gears 70, 71 or 73, as the case may be.

The pins 287 associated with the operating instrumentalities for the production sub-total and total production groups 34, 36 are diametrically opposed to the pins 280, 287, which are associated with the operating instrumentalities for the sub-total and total idle time print wheel groups 28, 30, such diametrical opposition being with respect to the shaft 72. Idle time does not run concurrently with production time and vice versa and thus when idle time is in effect no production time impulses should be transmitted to the print wheel groups 34 and 36. The reverse is true and during production time no impulses should be transmitted to the idle time print wheel groups 30 and 32. Toward these ends, the pins 287 are designed to fall into position at the end of resetting and printing operations against the cam surfaces 285 of the extensions 283 of the pawls 112 alternately in pairs to maintain such pawls as are associated with the production time groups elevated during idle time operations and to maintain such pawls as are associated with the idle time groups elevated during production time operation.

It is essential that should an impulse be received by either of the indexing solenoids ST or SPI, as the case may be, during the power reset cycle, i. e., during rotation of the shaft 72 and reset gears 70, 71 and 73, the effect of this impulse be stored for future use at the end of the power reset cycle, otherwise an impulse would be lost. It is also necessary that should an impulse be received by any one of the solenoids just mentioned during manual resetting operations when the shaft 72 is stationary, this impulse be stored for future use. Accordingly, two different kinds of impulse storing mechanism are provided, one for preventing an impulse from being effective during the power reset cycle when the shaft 72 is moving, and the other for preventing an impulse from being effective during manual resetting when the shaft 72 is stationary.

The means for preventing impulses from being effective during the power reset cycle is shown in Fig. 15. A plurality of ears 294 are struck downwardly from the bottom plate 61 of the ribbon assembly 60 and serve to support therebetween a horizontal shaft 296. A plurality of latch members 298 are pivotally mounted on the shaft 296 and have associated therewith springs 300, the tendency of which is to normally bias the latch members 298 in a clockwise direction. Each latch member 298 includes a latch arm 302 adapted when the member is in its normal latching position to bear against the rock shaft 186 which acts as a limit stop. Each latch member also includes a cam arm 306 having a cam surface 308 formed thereon and designed for engagement with a pair of studs 310 formed on one side of each of the two reset wheels 71 and 73. No latch member is provided for the reset wheel 70 because of the fact that wheel 70 controls the resetting of production totals, and since resetting operations occur only at the time of starting the machine or at the time of stopping the machine, in the former instance a machine product will not be turned out at the instant of machine starting and in the latter instance a machine product will not be turned out after the machine has stopped. The impulse storing mechanism under discussion is, therefore, applicable only to chronological time impulses and to either production or idle time impulses and only two such mechanisms are employed. When the latch member 298 is in its normal position with the latch arm 302 bearing against the shaft 186, the extreme end of this latch member is positioned in the path of movement of the extreme upper end of the lever 274. Should, therefore, an impulse be received, the upper end of the lever 274 will trip beneath the latch arm 302 and assume a position behind the same so that after the impulse has been dissipated the lever 274 will be held retracted with its respective core 270 retracted within its solenoid. The impulse will thus be stored for future use in indexing the print wheel groups until such a time as the power cycle is completed and one or the other of the two studs 310 comes into engagement with the cam surface 308 to tilt the latch member 298 in a counterclockwise direction against the action of the spring 300.

It is deemed pertinent at this point to state that the power cycle just referred to is initiated by one-half revolution of the shaft 72. The toothed sector of the production reset gear 70 and the toothed sector of the production time sub-total reset gear 73 are disposed on their respective gears with the same identical degree of orientation, whereas the toothed sector of the idle time sub-total reset gear 71 is disposed on its gear at an angle of 180° from the two other sectors. The reason for this is that resetting operations are conducted only at the end of a period of idle time or at the beginning of a period of production time. Since production time and idle time do not run concurrently, it is unnecessary to go through the motions of resetting idle time when no idle time is shown on the print wheels, and similarly, it is unnecessary to go through the motions of resetting production time when no production time is shown on the print wheels.

Figure 16:
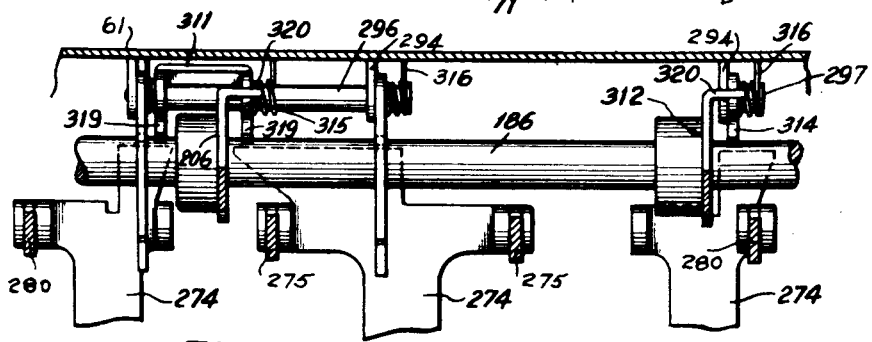
Fig. 16 is a sectional view taken substantially along the line 16—16 of Fig. 15.

The means for storing impulses received by the various solenoids ST, SPI and SP that might be received during manual resetting operations is shown in Figs. 6 and 16. In this instance, in the case of the solenoid SP, a latch member 312 is mounted on a stud 297 and is provided with a latch arm 314 designed for cooperation with the lever 274 of the solenoid SP, in the same manner as the latch arms 302 previously described. The latch member 312 is spring-pressed as at 316 in such a manner that the same will be urged in a counter-clockwise direction as viewed in Fig. 6. The latch member 312 is provided with a forwardly extending finger 318 which underlies a lateral extension 320 formed on one of the arms 206 which controls the elevation of the Geneva gear assembly. Thus it will be seen that whenever the Geneva gear assembly is in its elevated position, the latch member 312 is released for latching purposes, and whenever this assembly is in its lowered position the latch arm 314 is held out of the path of movement of the upper end of the lever 274.

In the case of the solenoids ST and SPI, a dual latch member 311 is provided. This latter member is generally of U-shaped design and is mounted on the shaft 296 and has associated therewith a single latch arm 315 adapted to underlie the lateral extension 320 associated with the arm 206. The latch member 311 is provided with two rearwardly extending latch arms 319, one being adapted to accommodate the lever 274 associated with the solenoid ST, and the other being adapted to accommodate the lever 274 associated with the solenoid SPI.

The single print wheel 40, shown at the extreme right-hand sides of Figs. 1 and 7 and which has thereon the indicia representative of special data, such as data relating to the identity of a particular workman, the reason for machine idle time or the like, is adapted to be manually set to any desired position by means of a finger knob 335 (Figs. 3 and 7) located on the outside of the machine casing and mounted on the side wall 16. The knob is provided with a shank 337 which projects through an aperture in the wall 16. A spring member 339, which is riveted to the shank 337, is provided with an inturned finger 341 adapted to project through a slot 343 (see Fig. 9) formed in a bifurcated actuator 345 mounted on a hub 347 rotatably carried on the end of the shaft 68 and also rotatably mounted in a bushing 349 projecting through the end plate 82. The hub 347 carries a gear 351 adapted to mesh with the driving gear 108 associated with the print wheel 40.

A circular face plate 353 mounted on the side wall 16 is provided with a plurality of indicia 355, corresponding to the indicia on the print wheel 40, and by means of which the operator may make his selection.

It is to be noted that the inturned finger 341 and bifurcated actuator 345 afford a means whereby the cover 11 may be removed from or installed on the base plate 10 without disturbing the neutral setting of the print wheel 40 and whereby when the cover is removed this print wheel will automatically be restored to such a neutral setting or position.

Referring now to Figs. 5 and 6 wherein the means for actuating the print bar 64 is best illustrated, a pair of bell crank levers 350 are pivotally mounted as at 352 to the side plates 42 and 44, on the outside and near the bottom thereof. Each bell crank lever 350 is provided with a long arm 354, the outer end of which carries a cam roller 356 designed for engagement with a cam 358 formed on a hub 359 mounted on the end of the shaft 238. Each lever 350 is also provided with a short arm 360, the outer end of which is pivotally connected by an eccentric adjusting connection 361 to the lower end of a toggle link 362. The upper end of the toggle link is pivotally connected as at 364 to an end of the print bar 64. The two cams 358 on the opposite ends of the shaft 238 are similarly oriented and thus it will be seen that as the high regions of these cams bear against the cam rollers 356, the two bell crank levers 350 will be moved in unison in such a manner as to cause alignment of the toggle link 362 and the short arm 360, thus forcing the print bar upwardly into engagement with the type on the print wheels 24. The print bar 64 carries the usual rubber platen pad 366. A pair of springs 368 serve to normally bias the levers 350 into cam engaging position.

The ribbon feeding and reversing mechanism 60 which appears in part in Fig. 7 forms no part of the present invention and, as a consequence, the details thereof have been omitted. For an understanding of this feeding and reversing mechanism, reference may be had to the copending application of which this is a division. It is sufficient for the present disclosure to state that the ribbon R is passed from one spool 400 to another spool 402 over a pair of upper ribbon guides 441 which are struck upwardly from the ribbon bottom plate 61 and beneath a pair of guide roller assemblies 443 suitably secured to the end plates 80 and 82. The ribbon thus leaves one of the ribbon spools and passes downwardly just outside one of the end plates 80 or 82, across the machine beneath the print wheel assembly, and upwardly along the outside of the other end plate back to the other ribbon spool.

In Figs. 5 and 6 the paper feed instrumentalities are illustrated. The record media is supplied in the form of the roll 54 which is wound in the conventional manner upon a spindle 452, the ends of which are loosely received in a pair of tapered inclined slots 454 formed in the end plates 80 and 82. The lower edge of each of the slots 454 is of such extent and is so inclined that when the ends of the spindle 452 are inserted therein the roll will, by gravity, assume a central position within the paper storage compartment 50. The upper edge of the partition 46 is provided with a plurality of forwardly curved fingers 456 which serve as paper guides, while a plurality of laterally extending flanges 458, also formed on the upper edge of the partition 46, serve as a support for a horizontal plate 460. A lower feed roller shaft 462 is rotatably supported between the two end plates 80 and 82 and is provided with a plurality of resilient feed rollers proper 464 at spaced points therealong. A spring-pressed upper idler feed roller 466 is biased against the feed rollers 464 and paper issuing from the roll 54 is adapted to pass over and around the rollers 464 and beneath the roller 466. An angular flange 468 extends between the two end plates 80 and 82 and is provided with a substantially horizontal flange portion 470 against which there is adapted to bear coextensively the outer end of a tension plate 472. The tension plate 472 is provided with a plurality of apertures therein through which are received a plurality of shouldered fingers 474, by means of which the tension plate 472 is maintained in position on the plate 460. Paper issuing from the roll 54 and passing between the feed rollers 464, 466, also passes between the flange portion 470 and forward edge of the tension plate 472 and from thence over the print bar 64 and downwardly over the surface of the inclined backing plate 25. The base plate 10 is formed with an elongated slot 476 near the forward edge thereof through which the printed record media may pass to a point of storage. The base plate 10 is provided with a forwardly and downwardly inclined surface 478 which cooperates with a toothed tear-off strip 480 in providing a slot 482 through which the record media may pass to a region of discharge.

The mechanical means for advancing the paper in step-by-step fashion comprises a ratchet wheel 484 which is positioned on the feed roller shaft 462 outside of the end plate 82. A holding pawl 486 which is spring-pressed as at 488 is pivoted to the end plate 82 and bears against the teeth of the ratchet wheel 484 to prevent over-throwing of the feed rollers 464, 466, during stepping operations. A driving pawl 490 is pivoted as at 492 to an operating lever 494, which in turn is pivoted as at 496 to the end plate 82. A coil spring 500 serves to normally maintain the lever 494 in its elevated position, while at the same time causing the pawl 490 to engage the periphery of the ratchet wheel 484. The lever 494 is provided with a cam roller 502 medially of its ends designed for engagement with a cam element 504 carried on the shaft 72 outside of the end plate 82. The cam 504 constitutes a paper feed indexing cam and is provided with a pair of relatively closely spaced cam protuberances 506 and 508 and a single removed cam protuberance 510. It will be seen that during the printing portion of a machine cycle, the cam roller 502 will ride outwardly on the cam protuberances 506 and 508 in rapid succession to actuate the lever 494, driving pawl 490 and ratchet wheel 484 twice in succession and index the paper twice, thus rendering a double space on the record media. When the cam roller 502 rides outwardly on the single cam protuberance 510, a single actuation of the record media advancing instrumentalities will occur. The reason for first resorting to double spacing operations and thereafter resorting to single spacing operations arises from the fact that after a particular machine has commenced its operation, the next printing material on the record media will be an accounting of machine idle time. After any such period of idle time when the machine is again set into operation, a record of the commencement of production time will be required. Thus, in Fig. 4, there is shown a grouping of the data into a series of two lines each, the first or lower line representing the condition of the machine when the same went into production and the second or upper line representing the condition of the machine at the commencement of an idle period. To avoid confusion, the paper advancing means above described makes provision for double spacing after each period of production time and idle time has been recorded. The operating lever 494 is provided with an extension or handle 511 which becomes available when the door 19 is swung open for manual indexing of the paper feeding instrumentalities.

The manner in which the cover 11 is made removable from the base plate 10 is shown in Figs. 5 and 7. Toward this end, a pair of latch plates 512 are secured to the inside of the side walls 16 and 18 of the cover 11 and are provided with laterally extending flanges 514 adapted to be engaged by latching fingers 516 formed on a pair of latching levers 518 pivoted as at 520 to the end plates 80 and 82 near the bottom thereof. The latching levers 518 are provided with operating handles 522 which become available for manipulation when the door 19 is swung to its open position. It is to be noted that the cover 11 fits closely over the internal recording machine instrumentalities and that thus there is very little waste space within the cover.

A lamp L (Fig. 5) is suitably mounted on the end plate 82 and projects across the front of the machine within the cover 11 for the purpose of illuminating the data appearing on the record media so that the latter may be readily readable through the window 22.

Referring now to Fig. 19, the circuit diagram therein is illustrative of a selected installation for the recording apparatus. It is to be distinctly understood that this installation is presented herewith purely for illustrative purposes and that numerous other installations are contemplated. In this installation the recording device which comprises the present invention is designated in its entirety at RD and is illustrated by means of a dotted line rectangle. The particular machine whose daily history it is adapted to record is shown at M. A time clock is shown at CL and may be of any conventional type which is adapted to close an electric circuit at definite time intervals.

The machine M has not been illustrated mechanically and is represented merely by a dotted line rectangle. This machine may be of any desired type, as for example, a lathe, a milling machine or other apparatus adapted to perform operations on successive units or pieces of work. To adapt the machine to the present recording apparatus there is associated with the former a relay R1, which may be either electrical or mechanical in its operation or which may be a combination of the two. The function of the relay R1 is to close a switch PS, hereinafter referred to as the production switch, whenever a unit of work is turned out of the machine. The machine also has associated therewith a second relay R2 including a solenoid S having a movable core 524 which normally occupies the full-line position when the solenoid is deenergized but which is adapted to be moved to its dotted line position when the solenoid is energized. The core 524 has mounted thereon a protuberance or finger 526 which operates to momentarily close a pair of contacts C1 (see also Fig. 17) whenever the position of the core 524 is shifted in either direction. In other words, the contacts C1 are adapted to become momentarily closed upon either energization or deenergization of the solenoid S. A normally open switch SS, hereinafter referred to as the start-stop switch, is disposed in the circuit of the solenoid S and is adapted by means of any suitable relay mechanism R3 to automatically become closed whenever the machine M is set into operation and to automatically become open when the machine ceases its operation.

The time clock CL is represented by a dotted line rectangle and is provided with a minute-impulse switch MS which serves at each minute interval to close an electric circuit through the solenoid ST associated with the recording device RD and which cumulatively actuates the time group of print wheels 26. The clock CL also includes a control switch CS which is adapted to be automatically closed at the commencement of a working time period, as for example, 8:00 a. m., and which is adapted to automatically open at the close of a work time period, as for example, 5:00 p. m. This latter switch CS is so arranged in series with the switch MS as to cause impulses to be sent to both the solenoids ST and SPI at minute intervals simultaneously when the switch CS is closed. It will be seen, therefore, that the solenoid ST is subject to impulses each minute at all times during the 24-hour day, while the solenoid SPI is subject to such minute impulses only during the working day of from 8:00 a. m. to 5:00 p. m.

The switch SS is adapted upon either becoming closed or becoming open to initiate the power reset cycle in the recording device RD during which the printing function, as well as certain other functions, are adapted to take place. This power cycle, as previously set forth, is accompanied by one-half revolution of the shaft 12, at which time certain resetting and printing operations will occur. The printing operations follow each other and alternately mark the end of a period of idle time, i. e., the commencement of a period of production time and the end of a period of production time, i. e., the commencement of a period of idle time. All printing operations occur at the commencement of the power cycle and are immediately followed by automatic reset operations which are performed on the sub-total groups of print wheels. Since the solenoid SPI serves to control the cumulative actuation of the production time groups of print wheels 28, 30, and of the idle time groups of print wheels 32, 34, the impulses sent to the solenoid SPI are alternately effective on the print wheel groups 28, 30, or 32, 34.

Initiation of the power cycle in either the case of deenergization or energization of the solenoid S is accompanied by closing of the contacts C1 and consequent energization of the solenoid SO. As shown in Figs. 8, 17, 18 and 19, a contact group C2 is mounted on the side of the casing of the solenoid SO and includes an arm 528 having an offset portion 530 formed thereon designed for cooperation with a cam roller 532 carried at the outer end of an arm 534 which is pivoted as at 536 on a bracket 538 carried by the standard 42. The arm 534 is provided with an upstanding lug 537 designed for cooperation with a pair of fingers 539 and 540 formed on the lower end of the previously mentioned bell crank lever 226 which is connected to the solenoid core 224 by means of the link 225.

Upon initial closing of the contacts C1, an impulse is applied to the solenoid SO, thus retracting its core 224. When the core 224 approaches its limit of attraction, the finger 539 engages the lug 537 to swing the arm 534 in a clockwise direction, as viewed in Fig. 17, thus causing the roller 532 to ride inwardly upon the body portion of the arm 528 to cause the contacts C2 to become open. The contacts C2 are arranged in series with the contacts C1 and thus opening of the contacts C2, as just described, causes deenergization of the solenoid SO and the core 224 of the latter is moved outwardly under the influence of the spring 227. As the core 224 approaches its limit of outward movement, the finger 540 engages the lug 537 to swing the arm 534 in a counter-clockwise direction, as viewed in Fig. 17, and cause the roller 532 to move onto the offset portion 530 of the arm 528 thus again closing the contacts C2. Such closing of the contacts C2 again causes energization of the solenoid SO and the stepping operation initiated by this solenoid, as previously described, is repeated successively. During such repetitive energization of the solenoid SO, the shaft 238 and ratchet wheel 236 (Fig. 18) are indexed. The ratchet wheel 236 has associated therewith a cam wheel 239 provided with a notch 241 in its periphery which cooperates with a finger 243 formed in a bell crank lever 245, the lower end of which carries a roller 247 which bears against the offset portion 530 of the arm 528. The repetitious energization of the solenoid SO continues until such time as the finger 243 falls in the notch 241, whereupon the roller 247 engages the offset portion 530 of the arm 528 and prevents further closing of the contacts C2, thus terminating the power cycle. It should be remembered at this point that by virtue of the studs 310 (Fig. 15) formed on the reset gears 71 and 73, the power cycle is alternately effective to cause printing of production time and idle time.

The production switch PS is electrically connected in series with the production solenoid SP and thus upon each closing and opening of this latter switch the solenoid SP will become momentarily energized to cause stepping of the print wheel groups 36, 38. While in the present embodiment the relay R1 has been designed to cause closing of the switch PS as each unit of work is produced by the machine M, it is obvious that this relay may be designed to close the switch PS at definite time intervals, as for example, every ten minutes. The particular arrangement of the various relays and other instrumentalities associated with the machine M is immaterial to the present invention and it is obvious that these instrumentalities may be suitably designed to accommodate the particular selected and desired function of the recording device.

While there have been shown and described and pointed out the fundamental novel features of the invention as applied to a preferred embodiment, it will be understood that various omissions and substitutions and changes in the form and details of the apparatus illustrated and in its operation may be made by those skilled in the art, without departing from the spirit of the invention. It is the intention, therefore, to be limited only as indicated by the scope of the following claims.

What is claimed is:

1. A recording device for monitoring the production and idle time of a production machine comprising a plurality of print wheel groups, one group being representative of production time, another group being representative of idle time and the third group being representative of unit production of said machine, printing instrumentalities common to said print wheels, means for periodically indexing the respective print wheel groups according to production time, idle time and unit production of the machine, means for automatically resetting said production time and production print wheel groups simultaneously at the end of a period of production time of the machine and for thereafter effecting a printing operation, means for preventing indexing of the said production time and unit production print wheel groups during the said resetting operation, and means for automatically resetting said idle time print wheel group individually at the end of a period of idle time of the machine.

2. A recording device for monitoring the production and idle time of a production machine comprising a plurality of print wheel groups, one group being representative of production time, another group being representative of idle time and the third group being representative of unit production of said machine, printing instrumentalities common to said print wheels, means for periodically indexing the respective print wheel groups according to production time, idle time and unit production of the machine, means for automatically resetting said production time and production print wheel groups simultaneously at the end of a period of production time of the machine and for thereafter effecting a printing operation, means for automatically resetting said idle time print wheel group individually at the end of a period of idle time of the machine, and means for preventing indexing of the said print wheel groups during resetting operations.

3. A recording device for monitoring the production and idle time of a production machine comprising a plurality of print wheel groups, one group being representative of production time, another group being representative of idle time and the third group being representative of unit production of said machine, printing instrumentalities common to said print wheels, means for periodically indexing the respective print wheel groups according to production time, idle time and unit production of the machine, means for automatically resetting said production time and production print wheel groups simultaneously at the end of a period of production time of the machine and for thereafter effecting a printing operation, means for automatically resetting said idle time print wheel group individually at the end of a period of idle time of the machine, means for preventing indexing of the said print wheel groups during resetting operations, and means cooperating with the said indexing preventing means for actuating the respective said indexing means after the said resetting operations are completed.

WARD LEATHERS.

REFERENCES CITED

The following references are of record in the file of this patent:

UNITED STATES PATENTS

| Number | Name | Date |
|---|---|---|
| 1,253,696 | Lasker | Jan. 15, 1918 |
| 1,263,571 | Larrabee | Apr. 23, 1918 |
| 1,284,430 | Norton | Nov. 12, 1918 |
| 1,329,062 | Johnson | Nov. 25, 1919 |
| 2,283,993 | Holtz et al. | May 26, 1942 |
| 2,307,958 | Richardson | Jan. 12, 1943 |
| 2,344,497 | Cooney | Mar. 21, 1944 |
| 2,396,869 | Poole | Apr. 18, 1944 |
| 2,440,665 | Jeffrey | Apr. 27, 1948 |